(12) United States Patent
van Borselen et al.

(10) Patent No.: US 9,025,413 B2
(45) Date of Patent: *May 5, 2015

(54) METHOD FOR FULL-BANDWIDTH SOURCE DEGHOSTING OF MARINE SEISMIC STREAMER DATA

(75) Inventors: Roald G. van Borselen, Voorschoten (NL); Christina D. Riyanti, Delft (NL); Christopher P. Page, Walton-on-Thames (GB); Jacob T. Fokkema, Schiedam (NL); Peter M. van den Berg, The Hague (NL)

(73) Assignee: PGS Geophysical AS, Oslo (NO)

( * ) Notice: Subject to any disclaimer, the term of this patent is extended or adjusted under 35 U.S.C. 154(b) by 440 days.

This patent is subject to a terminal disclaimer.

(21) Appl. No.: 12/653,099

(22) Filed: Dec. 7, 2009

(65) Prior Publication Data

US 2011/0134718 A1 Jun. 9, 2011

(51) Int. Cl.
*G01V 1/38* (2006.01)
*G01V 1/36* (2006.01)

(52) U.S. Cl.
CPC .............. *G01V 1/364* (2013.01); *G01V 1/3808* (2013.01); *G01V 2210/56* (2013.01)
USPC ........................................................ 367/24

(58) Field of Classification Search
CPC .. G01V 1/364; G01V 1/3808; G01V 2210/56
USPC ................................................ 367/15, 21–24
See application file for complete search history.

(56) References Cited

U.S. PATENT DOCUMENTS

| | | | |
|---|---|---|---|
| 5,696,734 A | 12/1997 | Corrigan | |
| 5,747,913 A * | 5/1998 | Amlee et al. | 310/263 |
| 6,477,470 B2 * | 11/2002 | Fokkema et al. | 702/17 |
| 6,654,694 B2 * | 11/2003 | Fokkema et al. | 702/18 |
| 6,747,913 B2 | 6/2004 | Fokkema et al. | |
| 7,072,767 B2 * | 7/2006 | Routh et al. | 702/14 |
| 7,164,619 B2 * | 1/2007 | Robertsson et al. | 367/21 |
| 7,778,108 B2 * | 8/2010 | Van Manen et al. | 367/15 |
| 7,986,586 B2 * | 7/2011 | van Borselen et al. | 367/24 |

(Continued)

FOREIGN PATENT DOCUMENTS

| | | |
|---|---|---|
| CN | 101556339 A | 10/2009 |
| EA | 005693 B1 | 4/2005 |
| EP | 0 782 011 A2 | 7/1997 |

(Continued)

OTHER PUBLICATIONS

Eurasian Search Report, date mailed: Jun. 3, 2011.

(Continued)

*Primary Examiner* — Krystine Breier

(57) ABSTRACT

Seismic data recorded in a marine streamer are obtained, sorted as a common receiver gather. A complex Laplace frequency parameter is used to transform the seismic data from a space-time domain to a spectral domain. An iterative conjugate gradient scheme, using a physically-based preconditioner, is applied to the transformed seismic data, to provide a least squares solution to a normal set of equations for a source deghosting system of equations. The solution is inverse-transformed back to a space-time domain to provide source deghosted seismic data, which is useful for imaging the earth's subsurface.

26 Claims, 4 Drawing Sheets

(56) References Cited

U.S. PATENT DOCUMENTS

| | | |
|---|---|---|
| 2009/0238036 A1 | 9/2009 | Robertsson et al. |
| 2009/0251992 A1* | 10/2009 | van Borselen et al. ......... 367/24 |
| 2009/9245920 | 10/2009 | Paffenholz |
| 2011/0110189 A1* | 5/2011 | Riyanti et al. .................. 367/24 |

FOREIGN PATENT DOCUMENTS

| | | |
|---|---|---|
| EP | 1 403 662 A1 | 3/2004 |
| RU | 2116657 C1 | 6/2011 |

OTHER PUBLICATIONS

Harrie Swartjes, European Search Report, Mailing Date: Sep. 6, 2012.

Chinese Office Action and Search Report issued in patent application No. 201010576744, mailed Apr. 4, 2014, 9 pages.

English translation of Chinese Office Action and Search Report issued in patent application No. 201010576744, mailed Apr. 4, 2014, 14 pages.

English Abstract for CN 101556339, Publication Date Oct. 14, 2009, 1 page.

* cited by examiner

METHOD FOR FULL-BANDWIDTH SOURCE DEGHOSTING OF MARINE SEISMIC STREAMER DATA

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of deghosting marine seismic streamer data.

2. Description of the Related Art

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The resulting seismic data obtained in performing a seismic survey, representative of earth's subsurface, is processed to yield information relating to the geologic structure and properties of the subsurface earth formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle acceleration sensors or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been utilized that contain water particle velocity sensors such as geophones or particle acceleration sensors such as accelerometers, in addition to hydrophones. The pressure sensors and particle motion sensors are typically deployed in close proximity, collocated in pairs or pairs of arrays along a seismic cable.

After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for seismic signals. The waves reflected at the surface will thus be phase-shifted 180 degrees relative to the upwardly propagating waves. The downwardly propagating wave recorded by the receivers is commonly referred to as the surface reflection or the receiver "ghost" signal. Source ghost signals are waves that first have propagated from the seismic source up to the water surface before propagating downward into the subsurface and back up to the receivers. Because of the surface reflection, the water surface acts like a filter, which creates spectral notches in the recorded signal, making it difficult to record data outside a selected bandwidth. Because of the influence of the surface reflection, some frequencies in the recorded signal are amplified and some frequencies are attenuated.

Currently in the art of geophysical marine seismic prospecting, a vessel tows very long streamers which have many seismic receivers attached, typically hydrophones (although other types of receivers can be employed). These receivers register a portion of a scattered acoustic wavefield originated from the sounding of a seismic source. The acoustic wavefield generated by the seismic source is scattered by reflections and refractions in the earth. In conventional marine seismic acquisition, the receivers of the streamer are located in array configurations at a particular depth position below the sea surface. Because of this arrangement, the so-called primary reflection, the direct response from source to subsurface and subsequently to the receivers, is clouded by the ghost reflection, from the wave that travels from source to subsurface and subsequently via the sea surface to the receivers. Removing the receiver ghost reflection from marine seismic data is the first stage in pre-processing the data to increase the resolving power. This procedure is known as receiver "deghosting". Removing the source ghost reflection from marine seismic data is another desired stage in pre-processing the data to further increase the resolving power. This procedure is known as source deghosting.

Thus, a need exists for a method for source deghosting marine seismic data that remains stable at all frequencies, even in the presence of spectral notches in the seismic data. In addition, the method should operate without any prior knowledge of the subsurface.

BRIEF SUMMARY OF THE INVENTION

The invention is a method for converting seismic data recorded in marine streamers into source deghosted seismic data. The seismic data recorded from the marine streamers are obtained, sorted as a receiver gather. A complex Laplace frequency parameter is used to transform the seismic data from a space-time domain to a spectral domain. An iterative conjugate gradient scheme, using a physically-based preconditioner, is applied to the transformed seismic data, to provide a least squares solution to a normal set of equations for a source deghosting system of equations. The solution is inverse-transformed back to a space-time domain to provide source deghosted seismic data, which is useful for imaging the earth's subsurface.

BRIEF DESCRIPTION OF THE DRAWINGS

The invention and its advantages may be more easily understood by reference to the following detailed description and the attached drawings, in which.

Figure 1:
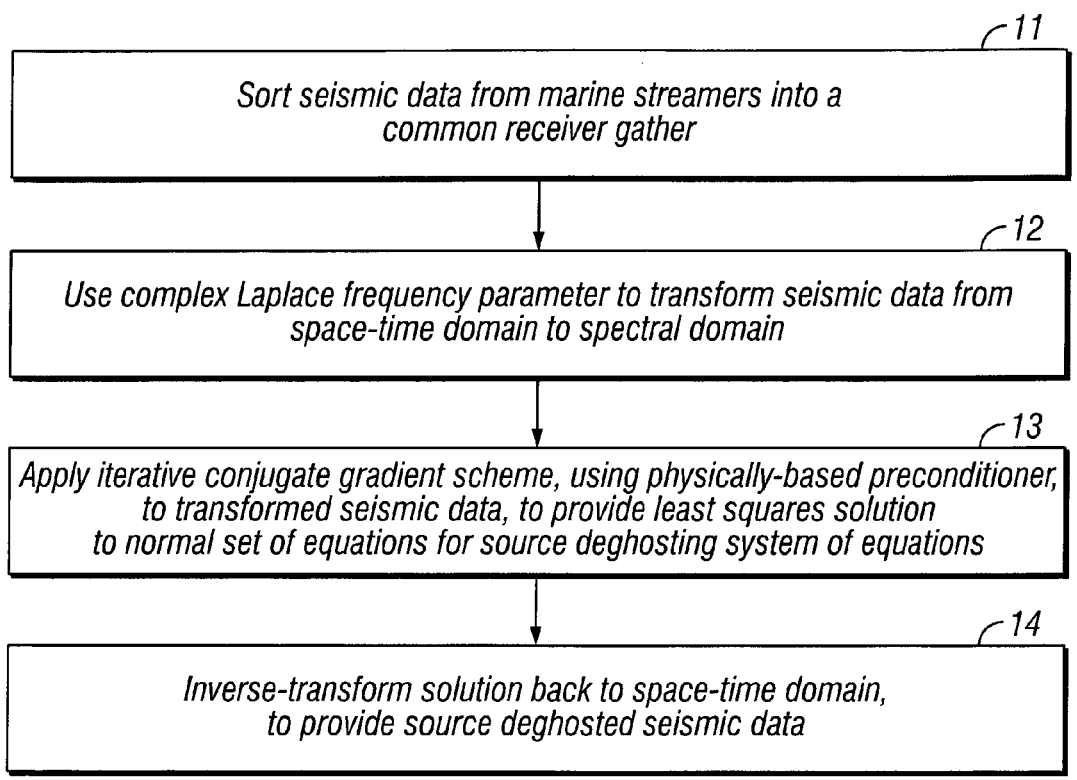
FIG. 1 is a flowchart illustrating a first embodiment of the invention for source deghosting marine seismic streamer data.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

One procedure for source deghosting marine seismic data is to decompose seismic wavefields to yield an up-going wavefield component. One method for the decomposition of seismic wavefields into up-going and down-going wavefield components is to solve a Fourier-type system of equations in which the solution derives from an inversion of a system with a well-defined Fourier kernel. In one example of this method, the system of equations is derived in the Laplace domain, where the forward Laplace transformation from the space-time domain (x,t) to the Laplace domain (x,s) is defined in general as:

$$\tilde{p}(x,s) = \int_{t \in T} \exp(-st) p(x,t) dt \tag{1}$$

and the corresponding backward Laplace transformation is defined as $$\chi_T(t) p(x, t) = \frac{1}{2\pi j} \int_{s-j\infty}^{s+j\infty} \exp(st) \tilde{p}(x, s) ds, \tag{2}$$

with $$\chi_T(t) = \left\{1, \frac{1}{2}, 0\right\}$$

for $t \in \{T, \partial T, T'\}$; $T = \{t \in \Re; t > t_0\}$, $\partial T = \{t \in \Re; t = t_0\}$; $T' = \{t \in \Re; t < t_0\}$. Here, t is time, x is space, $j = \sqrt{-1}$ is the imaginary unit, and s is a Laplace frequency parameter, discussed in more detail below.

In the following, the invention will be illustrated as acting on the pressure wavefield p(x,t), typically detected by pressure sensors such as hydrophones, although the type of wavefield and the type of sensors employed is not a restriction of the invention. The invention may be employed with any type of appropriate seismic sensor and its detected wavefields. For one example, particle motion wavefields and particle motion sensors could be employed. Modifying the following equations to accommodate other wavefields is straight forward.

In the Laplace transformation given above in Equations (1) and (2), the Laplace parameter s, the frequency parameter, is conventionally a purely imaginary number and is defined as $$s = j\omega = j2\pi f, \tag{3}$$

where ω is circular frequency and f is real frequency.

A problem arises when using the conventional Laplace frequency parameter s given in Equation (3). Spectral notches in the recorded seismic data occur when destructive interference takes place between seismic waves with particular combinations of frequencies and wavenumbers. When the Fourier-type set of source deghosting equations is solved for these frequencies f where spectral notches occur, then, the measured signal for those combinations of frequencies and wavenumbers is zero, since only background noise is recorded. When using a Laplace frequency parameter that is purely imaginary, such as defined in Equation (3) above, the inversion process becomes unstable. This instability then results in irreparable artifacts being introduced into the results of the seismic wavefield decomposition used for source deghosting.

To handle the instability resulting from these spectral notches, the method of the invention employs a Laplace frequency parameter s that is a complex variable with both real and imaginary parts. Thus, the Laplace frequency parameter s is now given not by Equation (3), but by:

$$s = j\omega + \epsilon = j2\pi f + \epsilon, \quad (4)$$

where $\epsilon$ is an additional real part of the complex Laplace frequency parameter s. In the following, the term "complex" will be used to designate that the Laplace frequency parameter has both real and imaginary parts, as in Equation (4). This complex Laplace frequency parameter s will be used in the Laplace and spectral domain transforms and in the source deghosting equations of the invention, as discussed below.

In one embodiment, the real part $\epsilon$ of the complex Laplace frequency parameter s may be a constant. In other embodiments, the real part $\epsilon$ may vary as a function of a combination such parameters as time, spatial location, or frequency. Thus, the real part $\epsilon$ may be expressed as, but is not limited to, the following:

$\epsilon = \text{constant}$;

$\epsilon = \epsilon(x)$, where $x = (x_1, x_2, x_3)$;

$\epsilon = \epsilon(t)$; $\epsilon = \epsilon(x,t)$;

$\epsilon = \epsilon(f)$; $\epsilon = \epsilon(x,f)$. (5)

Here, $x_1$ and $x_2$ are horizontal spatial coordinates, such as in-line and cross-line directions, respectively, and $x_3$ is a vertical spatial coordinate, such as depth.

The invention is a method for source deghosting marine seismic streamer data. The invention operates without any a priori knowledge of the subsurface. The source deghosting operation is performed on the recorded data for every receiver position separately. The recorded data is sorted into common receiver gathers, each gather containing all source data from one common receiver position. Then, for every frequency, the invention comprises a method for solving a system of source deghosting equations. Solution of the system of equations is obtained using a preconditioned conjugate gradient iterative method. The preconditioner is based on the physics of the problem at hand, rather than the mathematics (as would be the conventional approach). As an efficient preconditioner, the inverse of the horizontal source distribution is employed, since a more general source distribution can be treated as a perturbation of the simple regular horizontal source distribution.

However, the conventional deghosting method using the imaginary Laplace frequency parameter of Equation (3) can still become unstable at the notches in the frequency domain. Thus, the method of the invention employs the complex Laplace frequency parameter of Equation (4), which provides stability for the source deghosting procedure. Thus, the wavefield decomposition can be applied over the full seismic bandwidth, even in the presence of spectral notches in the seismic data. The use of this complex Laplace frequency parameter is described in detail below in the discussion with reference to the flowchart in FIG. 2.

FIG. 1 is a flowchart illustrating a first embodiment of the invention for source deghosting marine seismic streamer data.

In block 11, seismic data recorded from marine streamers are sorted into a common receiver gather.

In block 12, a complex Laplace frequency parameter is used to transform the seismic data from block 11 from a space-time domain to a spectral domain.

In block 13, an iterative conjugate gradient scheme, using a physically-based preconditioner, is applied to the transformed seismic data, to provide a least squares solution to a normal set of equations for a source deghosting system of equations.

In block 14, the seismic data from block 13 are inverse-transformed back to a space-time domain to provide source deghosted seismic data.

Figure 2:
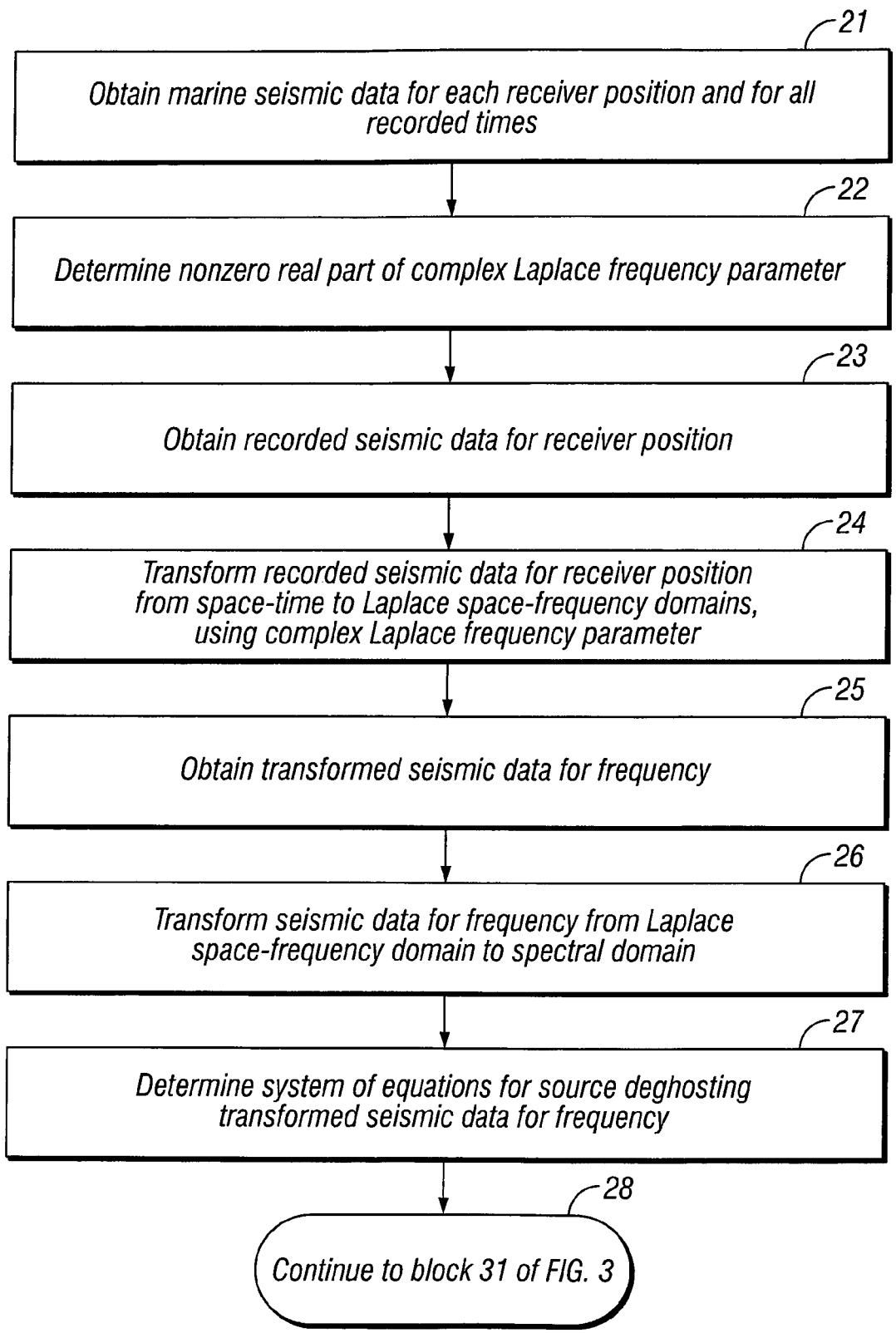
FIG. 2 is a flowchart illustrating an initial portion of a second embodiment of the invention for source deghosting marine seismic streamer data.

FIG. 2 is a flowchart illustrating an initial portion of a second embodiment of the invention for source deghosting marine seismic streamer data. The final portion will be discussed below with reference to the flowchart in FIG. 3.

In block 21, seismic data recorded with a marine streamer are sorted into a common receiver gather. The shot (seismic source activation) data for each receiver position, and for all recorded times t, is taken as input seismic data. The spatial position of the sources in a Cartesian coordinate frame is given by $x^S = (x_1^S, x_2^S, x_3^S)$. In the invention, the source depth $x_3^S = x_3^S(x_1^S, x_2^S)$ is a single-valued function of the horizontal coordinates $x_1^S$ and $x_2^S$. Thus, the source distributions are not vertical, but not necessarily horizontal. Otherwise, the positions of the sources is not intended to be a restriction on the invention.

In block 22, a real part $\epsilon$ of the complex Laplace frequency parameter s in Equation (4) is determined. In various embodiments, the real part $\epsilon$ may be as expressed in the examples given in Equation (5) above, but the invention is not restricted to these examples. By using different values of the real part $\epsilon$ in the Laplace frequency parameter s, the stabilization of the inversion in the method of the invention can be varied to provide for further stabilization in solving the system of source deghosting equations below.

In block 23, recorded seismic data for a receiver position are obtained from the seismic data obtained in block 21.

In block 24, the recorded seismic data for a receiver position from block 23 are temporally transformed from the space-time domain to the Laplace space-frequency domain. In an embodiment of the invention, the scattered wavefield $p^{sct}$ at the source locations is transformed from the space-time $(x_1^S, x_2^S, x_3^S, t)$ domain to the Laplace space-frequency $(x_1^S, x_2^S, x_3^S, s)$ domain by the forward Laplace transformation given in Equation (1), so:

$$p^{sct} = p^{sct}(x_{1,q}^S, x_{2,r}^S, x_{3,q,r}^S; s), \quad (6)$$

using the complex Laplace frequency parameter s of the invention in this transform, as given not by conventional Equation (3), but by Equation (4) above. Here, $p^{sct}$ is the scattered acoustic wavefield in the space-frequency domain, $x_{1,q}^S$ is an in-line source coordinate, q is an in-line source number, $x_{2,r}^S$ is a cross-line source coordinate, r is a cross-line source number, $x_{3,q,r}^S$ is source depth as a function of $x_{1,q}^S$ and $x_{2,r}^S$, and using $\epsilon$, as determined in block 22, as the real part of the complex Laplace frequency parameter s. This transform of the scattered wavefield $p^{sct}$ at the source locations is done for each receiver position.

In block 25, transformed seismic data from block 24 are obtained for a frequency f.

In block 26, the transformed seismic data for a frequency from block 25 are transformed from the Laplace space-frequency domain to a spectral domain. In an embodiment of the invention, the scattered wavefield $p^{sct}$ is transformed from the Laplace space-frequency domain $(x_1^S, x_2^S, x_3^S, s)$ to the spectral domain $(s\alpha_n, s\beta_m, x_3^S, s)$ by:

$$P_{n,m}^{sct} = \Delta x_1^S \Delta x_2^S \sum_{q=-\frac{1}{2}N+1}^{\frac{1}{2}N} \sum_{r=-\frac{1}{2}M+1}^{\frac{1}{2}M} \exp(js\alpha_n x_{1,q}^S + js\beta_m x_{2,r}^S) p^{sct}, \quad (7)$$

where:

$$s\alpha_n = n\Delta(s\alpha), \quad (8)$$
$$s\beta_m = m\Delta(s\beta),$$

and:

$$\Delta(s\alpha) = \frac{2\pi}{N\Delta x_1^S}, \quad (9)$$
$$\Delta(s\beta) = \frac{2\pi}{M\Delta x_2^S}.$$

Here, $P_{n,m}^{sct}$ is the scattered acoustic wavefield in the spectral domain, n is an in-line spectral number, m is a cross-line spectral number, $\Delta x_1^S$ is in-line source sampling distance. $\Delta x_2^S$ is cross-line source sampling distance, $js\alpha_n$ is an in-line spectral Fourier parameter, $\Delta(s\alpha)$ is in-line spectral sampling distance, $js\beta_m$ is a cross-line spectral Fourier parameter, $\Delta(s\beta)$ is cross-line spectral sampling distance, N is total number of in-line sources, and M is total number of cross-line sources. The complex Laplace frequency parameter s of the invention is also used in this transform to the spectral domain.

In block 27, a system of equations is determined for source deghosting the transformed seismic data for a frequency from block 26. The system of equations will be defined using the Laplace frequency parameter s of the invention to provide for stability in solving the equations. In the general case in which the source locations are located arbitrarily, the wavefield in the spectral domain cannot be determined explicitly. Therefore, the source deghosting procedure of the invention comprises solving a system of equations. For the general case with arbitrary source positions $x^S = (x_{1,q}^S, x_{2,r}^S, x_{3,q,r}^S)$ in the spectral domain, the depths of the sources are given by a single-valued function of the horizontal source coordinates. Specifically, the source depth is written as $x_{3,q,r}^S = x_3^S(x_{1,q}^S, x_{2,r}^S)$. In modern marine acquisition systems, this source position information is recorded. The source deghosting operation can then be compactly written as the solution of a system of equations:

$$\sum_{n=-\frac{1}{2}N+1}^{\frac{1}{2}N} \sum_{m=-\frac{1}{2}M+1}^{\frac{1}{2}M} K_{q,r;n,m} P_{n,m}^{dgh} = p_{q,r}^{sct}, \quad (10)$$

$$q = -\frac{1}{2}N+1, \ldots, \frac{1}{2}N,$$

$$r = -\frac{1}{2}M+1, \ldots, \frac{1}{2}M,$$

in which the system matrix $K_{q,r;n,m}$ is given by $$K_{q,r;n,m} = \frac{\Delta(s\alpha)\Delta(s\beta)}{4\pi^2} \quad (11)$$

$$\sum_{n=-\frac{1}{2}N+1}^{\frac{1}{2}N} \sum_{m=-\frac{1}{2}M+1}^{\frac{1}{2}M} \exp(-js\alpha_n x_{1,q}^S - js\beta_m x_{2,r}^S) 2\sinh(s\Gamma_{n,m} x_{3,q,r}^S).$$

Here, the unknown vector $P_{n,m}^{dgh}$ is the source deghosted acoustic wavefield at zero depth and is given in the spectral domain as:

$$P_{n,m}^{dgh} = P_{n,m}^{dgh}(s\alpha_n, s\beta_m, 0; s), \quad (12)$$

where the known vector $p_{q,r}^{sct}$ is the recorded seismic data in the space-frequency domain, given as:

$$p_{q,r}^{sct} = p^{sct}(x_{1,q}^S, x_{2,r}^S, x_{3,q,r}^S; s), \quad (13)$$

and the vertical propagation coefficient $s\Gamma_{n,m}$ is:

$$s\Gamma_{n,m} = j\sqrt{\left(\frac{2\pi f}{c}\right)^2 - (s\alpha_n)^2 - (s\beta_m)^2}, \quad (14)$$

where c is acoustic wave speed in water. The system matrix $K_{q,r;n,m}$ is a function of the complex Laplace frequency parameter s.

Figure 3:
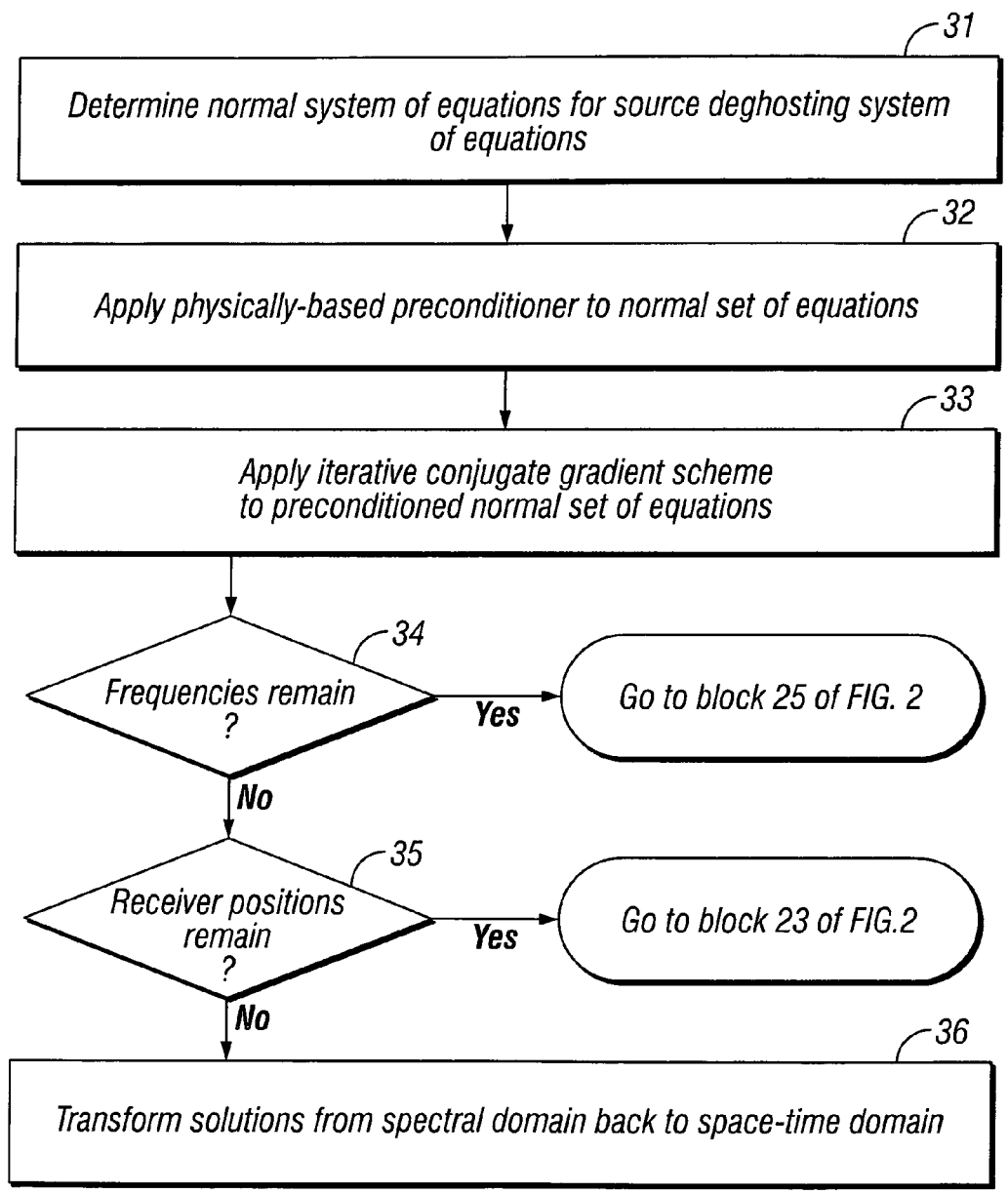
FIG. 3 is a flowchart illustrating a final portion of a second embodiment of the invention for source deghosting marine seismic streamer data, begun in FIG. 2.

In block 28, the process continues on to block 31 of FIG. 3 to solve the system of equations determined in block 27. The use of the fully complex Laplace frequency parameter s with a nonzero real part $\epsilon$, from Equation (4), instead of from Equation (3), provides stability in solving the equations.

FIG. 3 is a flowchart illustrating a final portion of a second embodiment of the invention for source deghosting marine seismic streamer data. The final portion continues the initial process discussed above with reference to the flowchart in FIG. 2.

In block 31, a normal set of equations is determined from the set of source deghosting equations in block 27 of FIG. 2. Since the known vector $p_{q,r}^{sct}$ is defined in the Laplace space-frequency domain and the unknown vector $P_{n,m}^{dgh}$ is defined in the spectral domain, a least-squares solution in the space-frequency domain is employed in the embodiment of the invention. Both sides of Equation (10) are multiplied by the complex conjugate of the system matrix $K_{q,r;n',m'}$ and the results are summed over all values of the in-line and cross-line source numbers q and r, respectively. After interchanging the latter summation over q and r and the summation over n and m, a system of normal equations is obtained, as follows:

$$\sum_{n=-\frac{1}{2}N+1}^{\frac{1}{2}N} \sum_{m=-\frac{1}{2}M+1}^{\frac{1}{2}M} A_{n',m';n,m} P_{n,m}^{dgh} = B_{n',m'}, \quad (15)$$

$$n' = -\frac{1}{2}N+1, \ldots, \frac{1}{2}N,$$

$$m' = -\frac{1}{2}M+1, \ldots, \frac{1}{2}M.$$

Here, the matrix $A_{n',m';n,m}$, a known quantity, is given by $$A_{n',m';n,m} = \sum_{q=-\frac{1}{2}N+1}^{\frac{1}{2}N} \sum_{r=-\frac{1}{2}M+1}^{\frac{1}{2}M} \overline{K_{q,r;n',m'}} K_{q,r;n,m}, \quad (16)$$

and the vector $B_{n',m'}$, a known quantity, is given by $$B_{n',m'} = \sum_{q=-\frac{1}{2}N+1}^{\frac{1}{2}N} \sum_{r=-\frac{1}{2}M+1}^{\frac{1}{2}M} \overline{K_{q,r;n',m'}} P_{q,r}^{sct}, \quad (17)$$

where n and n' are in-line spectral numbers, m and m' are cross-line spectral numbers, and the overline above the system matrix $K_{q,r;n',m'}$ designates complex conjugation.

The invention provides a method for providing the solution of this linear set of normal equations in Equation (15) in a stable manner, even in the presence of spectral notches in the seismic data, by using a complex Laplace frequency parameter. The geometrical arrangement of the source positions is not a restriction of the invention. The invention applies to the simple case of regular horizontal source distributions as well as to the general case of irregular non-horizontal source distributions. The invention will be illustrated first for the simple case and then for the general case.

The simple case of a conventional source distribution, considered in a strictly horizontal configuration, is just a special case of the general case handled by the invention. In this simple horizontal case, the source depth position $x_3^S$ is constant and the inversion of the system of equations reduces to the standard source deghosting procedure. The system of equations can be solved by an inverse discrete Fourier transform. In particular, the system of equations given generally in Equations (10) and (11) become the simpler system of equations:

$$\frac{\Delta(s\alpha)\Delta(s\beta)}{4\pi^2} \quad (18)$$

$$\sum_{n=-\frac{1}{2}N+1}^{\frac{1}{2}N} \sum_{m=-\frac{1}{2}M+1}^{\frac{1}{2}M} \exp(-js\alpha_n x_{1,q}^S - js\beta_m x_{2,r}^S) 2\sinh(s\Gamma_{n,m} x_3^S) P_{n,m}^{dgh} =$$

$$p^{sct}(x_{1,q}^S, x_{2,r}^S, x_3^S; s),$$

$$q = -\frac{1}{2}N+1, \ldots, \frac{1}{2}N,$$

$$r = -\frac{1}{2}M+1, \ldots, \frac{1}{2}M.$$

Here, the source deghosting for constant $x_3^S$ can be carried out explicitly in the spectral domain. The source deghosted field in the spectral domain at zero depth level, $p_{n,m}^{dgh}$ as defined in Equation (12), can be obtained directly as:

$$P_{n,m}^{dgh} = \frac{P_{n,m}^{sct}}{2\sinh(s\Gamma_{n,m} x_3^S)}. \quad (19)$$

For the solution of the general set of linear equations in the normal equations given in Equation (15), many efficient solvers are available, such as direct solvers and iterative solvers. A very efficient iterative solver is a preconditioned conjugate gradient iterative method based on the minimization of the discrepancies between the measured data and the modelled response. In a further embodiment of the invention, Equation (10) is considered and a solution to the spectral source deghosted wavefield $P_{n,m}^{dgh}$ is developed employing a conjugate gradient iterative scheme, such that an error ERR given by:

$$ERR = \sum_{q=-\frac{1}{2}N+1}^{\frac{1}{2}N} \sum_{r=-\frac{1}{2}N+1}^{\frac{1}{2}N} \left| P_{q,r}^{sct} - \sum_{n=-\frac{1}{2}N+1}^{\frac{1}{2}N} \sum_{m=-\frac{1}{2}M+1}^{\frac{1}{2}M} K_{q,r;n,m} P_{n,m}^{dgh} \right|^2 \quad (20)$$

is minimized.

Returning to FIG. 3, in block 32, the normal equations from block 31 are preconditioned with a physically-based preconditioner. A preconditioner is often used in conjugate gradient iterative methods to make the equations well-conditioned. Standard preconditioners, such as multi-level ILU (Incomplete Lower Upper decomposition) types, for example, are usually based on the mathematical structure of the system matrix. Unfortunately, for the present problem, these mathematics-based preconditioners are inefficient. In an embodiment of the invention, a preconditioner is used which is based on the physics of the problem being solved, which is the general case of a source distribution, discussed above.

An irregular non-horizontal source distribution can be considered as a perturbation of a regular horizontal source distribution, so the inverse of the system matrix of an irregular non-horizontal source distribution is approximated by the inverse of the system matrix of a regular horizontal source distribution. Hence, the inverse of the system matrix of an equivalent horizontal source distribution is taken as preconditioner. Note that if the source distribution is horizontal, then the conjugate gradient iterative scheme terminates within a single iteration with this preconditioner. For a horizontal source distribution, the system of normal equations of Equation (15) is diagonal and the solution is directly obtained as:

$$P_{n,m}^{dgh} = [A_{n,m;n,m}]^{-1} B_{n,m}. \quad (21)$$

In an embodiment of the invention, the preconditioner $\tilde{P}_{n,m}$ employed, following Equation (16), is:

$$\tilde{P}_{n,m} = [A_{n,m;n,m}]^{-\frac{1}{2}} = \left( \sum_{q=-\frac{1}{2}N+1}^{\frac{1}{2}N} \sum_{r=-\frac{1}{2}M+1}^{\frac{1}{2}M} |K_{q,r;n,m}|^2 \right)^{-\frac{1}{2}}. \quad (22)$$

For convenience, Equation (10) can be written in the compact form:

$$\sum_n K_{q,n} P_n^{dgh} = P_q^{sct}, \quad (23)$$

where n stands for (n,m) and q stands for (q,r) now. The preconditioner $\tilde{P}_{n,m}$ is a function of the complex Laplace frequency parameter s.

In block 33, a preconditioned conjugate gradient iterative scheme is applied to solve the system of equations in Equation (23), the preconditioned normal set of equations from block 32. In each iteration, designated with number k, an approximate value of the spectral source deghosted wavefield $P_n^{dgh(k)}$ is obtained with a residual error $r_q^{(k)}$. Thus, at the $k^{th}$ iteration, the $k^{th}$ residual error is given by:

$$r_q^{(k)} = p_q^{sct} - \sum_n K_{q,n} P_n^{dgh(k)}. \qquad (24)$$

A particular embodiment of the invention for a preconditioned conjugate gradient iterative scheme is described below with reference to the discussion of the flowchart in FIG. 4.

In block 34, it is determined if any frequencies selected in block 25 of FIG. 2 remain. If frequencies remain, the process returns to block 25 of FIG. 2. If no frequencies remain, then the process continues on to step 35. Hence, the solution by conjugate gradient iterations is repeated for each frequency f.

In block 35, it is determined if any receiver positions selected in block 23 of FIG. 2 remain. If receiver positions remain, the process returns to block 23 of FIG. 2. If no receiver positions remain, then the process continues on to step 36. Hence, the solution by conjugate gradient iterations is repeated for each receiver position.

In block 36, the source deghosted solutions from block 33 are transformed from the spectral domain back to the space-time domain. After obtaining the source deghosted wavefield in the spectral domain, the source deghosted wavefield, $p^{dgh}=p^{dgh}(x_{1,q}^S,x_{2,q}^S,0;s)$, at zero depth in the space-time domain is obtained as:

$$p^{dgh} = \frac{\Delta(s\alpha)\Delta(s\beta)}{4\pi^2} \sum_{n=-\frac{1}{2}N+1}^{\frac{1}{2}N} \sum_{m=-\frac{1}{2}M+1}^{\frac{1}{2}M} \exp(-js\alpha_n x_{1,q}^S - js\beta_m x_{2,r}^S)P_{n,m}^{dgh}. \qquad (25)$$

The source deghosted wavefield $p^{dgh}$ is a function of the complex Laplace frequency parameter s.

Figure 4:
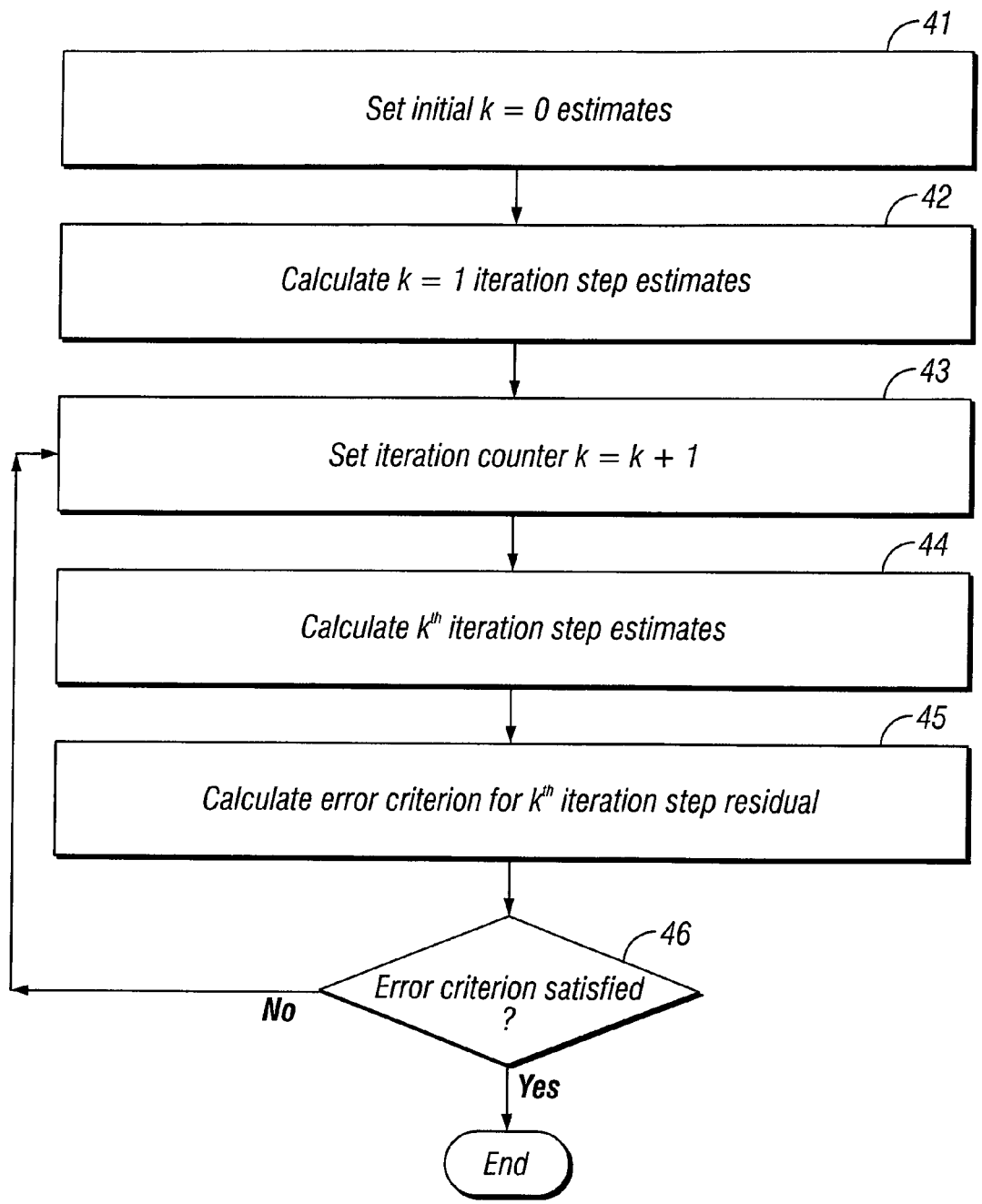
FIG. 4 is a flowchart illustrating an embodiment of the invention for an iterative preconditioned conjugate gradient scheme used for source deghosting marine seismic streamer data.

FIG. 4 is a flowchart illustrating an embodiment of the invention for an iterative preconditioned conjugate gradient scheme used for source deghosting marine seismic streamer data. This is the scheme referred to in block 33 of FIG. 3, above.

In block 41, a zero initial estimate for iteration counter k=0 is selected. In one embodiment, this estimate is:

$$P_n^{dgh(0)}=0, \; r_q^{(0)}=p_q^{sct}. \qquad (26)$$

In other embodiments, different choices for the initial estimate of the conjugate gradient scheme may be used. For example, the different choices can include, but are not limited to, the solution obtained for a previous frequency or the solution for a different receiver position.

In block 42, an estimate for iteration counter k=1 is calculated. In one embodiment, these estimates are:

$$g_n^{(1)} = \tilde{P}_n \sum_q \overline{K_{q,n}} r_q^{(0)}, \qquad (27)$$

$$v_n^{(1)} = \tilde{P}_n g_n^{(1)},$$

$$Kv_n^{(1)} = \sum_n K_{q,n} v_n^{(1)},$$

$$\alpha^{(1)} = \frac{\sum_n |g_n^{(1)}|^2}{\sum_q |Kv_n^{(1)}|^2},$$

-continued $$P_n^{dgh(1)} = P_n^{dgh(0)} + \alpha^{(1)} v_n^{(1)},$$

$$r_q^{(1)} = r_q^{(0)} - \alpha^{(1)} Kv_n^{(1)}.$$

In block 43, the iteration counter k is increased by 1. Thus, k=k+1, yielding k=2, 3, . . . , sequentially.

In block 44, an estimate for iteration counter k is calculated, using estimates for iteration counter k−1. In one embodiment, this estimate is:

$$g_n^{(k)} = \tilde{P}_n \sum_q \overline{K_{q,n}} r_q^{(k-1)}, \qquad (28)$$

$$v_n^{(k)} = \tilde{P}_n g_n^{(k)} + \frac{\sum_n |g_n^{(k)}|^2}{\sum_n |g_n^{(k-1)}|^2} v_n^{(k)},$$

$$Kv_n^{(k)} = \sum_n K_{q,n} v_n^{(k)},$$

$$\alpha^{(k)} = \frac{\sum_n |g_n^{(k)}|^2}{\sum_q |Kv_n^{(k)}|^2},$$

$$P_n^{dgh(k)} = P_n^{dgh(k-1)} + \alpha^{(k)} v_n^{(k)},$$

$$r_q^{(k)} = r_q^{(k-1)} - \alpha^{(k)} Kv_n^{(k)}.$$

In block 45, an error criterion is calculated for the current $k^{th}$ iteration estimate of the residual $r_q^{(k)}$ from block 44. In one embodiment, this error criterion is:

$$\frac{\sum_q |r_q^{(k)}|^2}{\sum_q |p_q^{sct}|^2} < 10^{-3}. \qquad (29)$$

In block 46, it is determined if the error criterion in block 45 is satisfied. If the error criterion is not satisfied, then the iterative process returns to block 43 to continue with another set of estimates. If the error criterion is satisfied, then the iterative process ends.

When using the inversion approach and utilizing the complex Laplace frequency parameter s, the source deghosting decomposition method of the invention can be reformulated into different domains, including, but not limited to, the frequency-slowness domain, or the tau-slowness domain or the space-time domain.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for converting seismic data recorded from marine streamers into source deghosted seismic data, comprising:

using a programmable computer to perform the following:
sorting the seismic data recorded from the marine streamers into a common receiver gather;
using a complex Laplace frequency parameter to transform the seismic data from a space-time domain to a spectral domain;
applying an iterative conjugate gradient scheme, using a physically-based preconditioner, to the transformed seismic data, to provide a least squares solution to a normal set of equations for a source deghosting system of equations; and
inverse-transforming the solution back to a space-time domain to provide the source deghosted seismic data, useful for imaging the earth's subsurface.

2. The method of claim 1, wherein the using a complex Laplace frequency parameter comprises:
determining a nonzero real part of the complex Laplace frequency parameter;
obtaining the recorded seismic data for a seismic receiver position;
using the complex Laplace frequency parameter to transform the recorded seismic data for the seismic receiver position from the space-time domain to a space-frequency domain;
obtaining transformed seismic data for a frequency; and
using the complex Laplace frequency parameter to transform the transformed seismic data for a frequency from the space-frequency domain to the spectral domain.

3. The method of claim 2, wherein the complex Laplace frequency parameter s is given by:

$$s = j\omega + \epsilon = j2\pi f + \epsilon,$$

where j is imaginary unit $\sqrt{-1}$, $\omega$ is circular frequency, f is frequency, and $\epsilon$ is the determined nonzero real part of the complex Laplace frequency parameter s.

4. The method of claim 3, wherein the using the complex Laplace frequency parameter to transform the recorded seismic data comprises:
transforming the scattered acoustic wavefield from the space-time $(x_1^S, x_2^S, x_3^S, t)$ domain to the space-frequency $(x_1^S, x_2^S, x_3^S, s)$ domain using a Laplace transform, so:

$$p^{sct} = p^{sct}(x_{1,q}^S, x_{2,r}^S, x_{3,q,r}^S; s),$$

where $p^{sct}$ is the scattered acoustic wavefield in the space-frequency domain, $x_{1,q}^S$ is an in-line source coordinate, q is an in-line receiver number, $x_{2,r}^S$ is a cross-line source coordinate, r is a cross-line source number, and $x_{3,q,r}^S$ is source depth as a function of $x_{1,q}^S$ and $x_{2,r}^S$.

5. The method of claim 4, wherein the using a complex Laplace frequency parameter to transform the transformed seismic data comprises:
transforming the scattered wavefield $p^{sct}$ from the space-frequency domain $(x_1^S, x_2^S, x_3^S, s)$ to the spectral domain $(s\alpha_n, s\beta_m, x_3^S, s)$ by:

$$P_{n,m}^{sct} = \Delta x_1^S \Delta x_2^S \sum_{q=-\frac{1}{2}N+1}^{\frac{1}{2}N} \sum_{r=-\frac{1}{2}M+1}^{\frac{1}{2}M} \exp(js\alpha_n x_{1,q}^S + js\beta_m x_{2,r}^S) p^{sct},$$

where:

$$s\alpha_n = n\Delta(s\alpha),$$

$$s\beta_m = m\Delta(s\beta),$$

and:

$$\Delta(s\alpha) = \frac{2\pi}{N\Delta x_1^S},$$

$$\Delta(s\beta) = \frac{2\pi}{M\Delta x_2^S},$$

and $P_{n,m}^{sct}$ is the scattered acoustic wavefield in the spectral domain, n is an in-line spectral number, m is a cross-line spectral number, $\Delta x_1^S$ is in-line source sampling distance, $\Delta x_2^S$ is cross-line source sampling distance, $js\alpha_n$ is an in-line spectral Fourier parameter, $\Delta(s\alpha)$ is in-line spectral sampling distance, $js\beta_m$ is a cross-line spectral Fourier parameter, $\Delta(s\beta)$ is cross-line spectral sampling distance, N is total number of in-line sources, and M is total number of cross-line sources.

6. The method of claim 5, further comprising:
determining a system of equations for source deghosting the transformed seismic data for a frequency;
determining a normal set of equations for the source deghosting system of equations; and
applying a physically-based preconditioner to the normal set of equations.

7. The method of claim 6, wherein the determining a system of equations for source deghosting comprises applying the following equation:

$$\sum_{n=-\frac{1}{2}N+1}^{\frac{1}{2}N} \sum_{m=-\frac{1}{2}M+1}^{\frac{1}{2}M} K_{q,r,n,m} P_{n,m}^{dgh} = p_{q,r}^{sct},$$

$$q = -\frac{1}{2}N + 1, \ldots, \frac{1}{2}N,$$

$$r = -\frac{1}{2}M + 1, \ldots, \frac{1}{2}M,$$

in which the system matrix $K_{q,r;n,m}$ is given by $$K_{q,r,n,m} = \frac{\Delta(s\alpha)\Delta(s\beta)}{4\pi^2} \sum_{n=-\frac{1}{2}N+1}^{\frac{1}{2}N} \sum_{m=-\frac{1}{2}M+1}^{\frac{1}{2}M} \exp(-js\alpha_n x_{1,q}^S - js\beta_m x_{2,r}^S) 2\sinh(s\Gamma_{n,m} x_{3,q,r}^S).$$

8. The method of claim 7, wherein the determining a normal set of equations comprises applying the following equation:

$$\sum_{n=-\frac{1}{2}N+1}^{\frac{1}{2}N} \sum_{m=-\frac{1}{2}M+1}^{\frac{1}{2}M} A_{n',m';n,m} P_{n,m}^{dgh} = B_{n',m'},$$

$$n' = -\frac{1}{2}N+1, \ldots, \frac{1}{2}N,$$

$$m' = -\frac{1}{2}M+1, \ldots, \frac{1}{2}M,$$

where, the matrix $A_{n',m';n,m}$ is given by $$A_{n',m';n,m} = \sum_{q=-\frac{1}{2}N+1}^{\frac{1}{2}N} \sum_{r=-\frac{1}{2}M+1}^{\frac{1}{2}M} \overline{K_{q,r,n',m'}} K_{q,r,n,m},$$

the known vector $B_{n',m'}$ is given by $$B_{n',m'} = \sum_{q=-\frac{1}{2}N+1}^{\frac{1}{2}N} \sum_{r=-\frac{1}{2}M+1}^{\frac{1}{2}M} \overline{K_{q,r,n',m'}} p_{q,r}^{sct},$$

and n and n' are in-line spectral numbers, m and m' are cross-line spectral numbers, and the overline designates complex conjugation.

9. The method of claim 7, wherein the preconditioner comprises an inverse of the system matrix for a horizontal source distribution.

10. The method of claim 9, wherein the applying a preconditioner comprises applying the following equation:

$$\tilde{P}_{n,m} = [A_{n,m;n,m}]^{-\frac{1}{2}} = \left( \sum_{q=-\frac{1}{2}N+1}^{\frac{1}{2}N} \sum_{r=-\frac{1}{2}M+1}^{\frac{1}{2}M} |K_{q,r,n,m}|^2 \right)^{-\frac{1}{2}}.$$

11. The method of claim 1, wherein the applying an iterative conjugate gradient scheme comprises:

selecting an initial estimate for iteration counter k=0, as follows:

$$P_n^{dgh(0)} = 0, \; r_q^{(0)} = p_q^{sct};$$

calculating estimates for iteration counter k=1, as follows:

$$g_n^{(1)} = \tilde{P}_n \sum_q \overline{K_{q,n}} r_q^{(0)},$$

$$v_n^{(1)} = \tilde{P}_n g_n^{(1)},$$

$$Kv_n^{(1)} = \sum_n K_{q,n} v_n^{(1)},$$

$$\alpha^{(1)} = \frac{\sum_n |g_n^{(1)}|^2}{\sum_q |Kv_n^{(1)}|^2},$$

$$P_n^{dgh(1)} = P_n^{dgh(0)} + \alpha^{(1)} v_n^{(1)},$$

$$r_q^{(1)} = r_q^{(0)} - \alpha^{(1)} Kv_n^{(1)};$$

performing the following until an error criterion is met:
increasing the iteration counter by k=k+1; and
calculating estimates for iteration counter k, using previous estimates calculated for k−1, as follows:

$$g_n^{(k)} = \tilde{P}_n \sum_q \overline{K_{q,n}} r_q^{(k-1)},$$

$$v_n^{(k)} = \tilde{P}_n g_n^{(k)} + \frac{\sum_n |g_n^{(k)}|^2}{\sum_n |g_n^{(k-1)}|^2} v_n^{(k)},$$

$$Kv_n^{(k)} = \sum_n K_{q,n} v_n^{(k)},$$

$$\alpha^{(k)} = \frac{\sum_n |g_n^{(k)}|^2}{\sum_q |Kv_n^{(k)}|^2},$$

$$P_n^{dgh(k)} = P_n^{dgh(k-1)} + \alpha^{(k)} v_n^{(k)},$$

$$r_q^{(k)} = r_q^{(k-1)} - \alpha^{(k)} Kv_n^{(k)}.$$

12. The method of claim 11, wherein the error criterion is given by:

$$\frac{\sum_q |r_q^{(k)}|^2}{\sum_q |p_q^{sct}|^2} < 10^{-3}.$$

13. The method of claim 5, wherein the inverse-transforming the solution comprises applying the following equation:

$$p^{dgh} = \frac{\Delta(s\alpha)\Delta(s\beta)}{4\pi^2} \sum_{n=-\frac{1}{2}N+1}^{\frac{1}{2}N} \sum_{m=-\frac{1}{2}M+1}^{\frac{1}{2}M} \exp(-js\alpha_n x_{1,q}^S - js\beta_m x_{2,r}^S) P_{n,m}^{dgh}.$$

14. A computer readable medium with a computer program stored thereon, the program having logic operable to cause a programmable computer to perform steps comprising:

sorting seismic data recorded with a marine streamer into a common receiver gather;

using a complex Laplace frequency parameter to transform the seismic data from a space-time domain to a spectral domain;

applying an iterative conjugate gradient scheme, using a physically-based preconditioner, to the transformed seismic data, to provide a least squares solution to a normal set of equations for a source deghosting system of equations; and inverse-transforming the solution back to a space-time domain to provide source deghosted seismic data.

15. The medium of claim 14, wherein the using a complex Laplace frequency parameter comprises:

determining the nonzero real part of the complex Laplace frequency parameter;

obtaining the recorded seismic data for a seismic receiver position;

using the complex Laplace frequency parameter to transform the recorded seismic data for the seismic receiver position from the space-time domain to the space-frequency domain;

obtaining transformed seismic data for a frequency; and using the complex Laplace frequency parameter to transform the transformed seismic data for a frequency from the space-frequency domain to the spectral domain.

16. The medium of claim 15, wherein the complex Laplace frequency parameter s is given by:

$$s = j\omega + \epsilon = j2\pi f + \epsilon,$$

where j is imaginary unit $\sqrt{-1}$, $\omega$ is circular frequency, f is frequency, and $\epsilon$ is the determined nonzero real part of the complex Laplace frequency parameter s.

17. The medium of claim 16, wherein the using the complex Laplace frequency parameter to transform the recorded seismic data comprises:

transforming the scattered acoustic wavefield from the space-time $(x_1^S, x_2^S, x_3^S, t)$ domain to the space-frequency $(x_1^S, x_2^S, x_3^S, s)$ domain using a Laplace transform, so:

$$p^{sct} = p^{sct}(x_{1,q}^S, x_{2,r}^S, x_{3,q,r}^S; s),$$

where $p^{sct}$ is the scattered acoustic wavefield in the space-frequency domain, $x_{1,q}^S$ is an in-line source coordinate, q is an in-line source number, $x_{2,r}^S$ is a cross-line source coordinate, r is a cross-line source number, and $x_{3,q,r}^S$ is source depth as a function of $x_{1,q}^S$ and $x_{2,r}^S$.

18. The medium of claim 17, wherein the using the complex Laplace frequency parameter to transform the transformed seismic data comprises:

transforming the scattered wavefield $p^{sct}$ from the space-frequency domain $(x_1^S, x_2^S, x_3^S, s)$ to the spectral domain $(s\alpha_n, s\beta_m, x_3^S, s)$ by:

$$P_{n,m}^{sct} = \Delta x_1^S \Delta x_2^S \sum_{q=-\frac{1}{2}N+1}^{\frac{1}{2}N} \sum_{r=-\frac{1}{2}M+1}^{\frac{1}{2}M} \exp(js\alpha_n x_{1,q}^S + js\beta_m x_{2,r}^S) p^{sct},$$

where:

$$s\alpha_n = n\Delta(s\alpha),$$

$$s\beta_m = m\Delta(s\beta),$$

and:

$$\Delta(s\alpha) = \frac{2\pi}{N\Delta x_1^S},$$

$$\Delta(s\beta) = \frac{2\pi}{M\Delta x_2^S},$$

and $P_{n,m}^{sct}$ is the scattered acoustic wavefield in the spectral domain, n is an in-line spectral number, m is a cross-line spectral number, $\Delta x_1^S$ is in-line source sampling distance, $\Delta x_2^S$ is cross-line source sampling distance, $js\alpha_n$ is an in-line spectral Fourier parameter, $\Delta(s\alpha)$ is in-line spectral sampling distance, $js\beta_m$ is a cross-line spectral Fourier parameter, $\Delta(s\beta)$ is cross-line spectral sampling distance, N is total number of in-line sources, and M is total number of cross-line sources.

19. The medium of claim 18, further comprising:

determining a system of equations for source deghosting the transformed seismic data for a frequency;

determining a normal set of equations for the source deghosting system of equations; and applying a physically-based preconditioner to the normal set of equations.

20. The medium of claim 19, wherein the determining a system of equations for source deghosting comprises applying the following equation:

$$\sum_{n=-\frac{1}{2}N+1}^{\frac{1}{2}N} \sum_{m=-\frac{1}{2}M+1}^{\frac{1}{2}M} K_{q,r;n,m} P_{n,m}^{dgh} = P_{q,r}^{sct},$$

$$q = -\frac{1}{2}N + 1, \ldots, \frac{1}{2}N,$$

$$r = -\frac{1}{2}M + 1, \ldots, \frac{1}{2}M,$$

in which the system matrix $K_{q,r;n,m}$ is given by $$K_{q,r;n,m} = \frac{\Delta(s\alpha)\Delta(s\beta)}{4\pi^2} \sum_{n=-\frac{1}{2}N+1}^{\frac{1}{2}N} \sum_{m=-\frac{1}{2}M+1}^{\frac{1}{2}M} \exp(-js\alpha_n x_{1,q}^S - js\beta_m x_{2,r}^S) 2\sinh(s\Gamma_{n,m} x_{3,q,r}^S).$$

21. The medium of claim 20, wherein the determining a normal set of equations comprises applying the following equation:

$$\sum_{n=-\frac{1}{2}N+1}^{\frac{1}{2}N} \sum_{m=-\frac{1}{2}M+1}^{\frac{1}{2}M} A_{n',m';n,m} P_{n,m}^{dgh} = B_{n',m'},$$

$$n' = -\frac{1}{2}N + 1, \ldots, \frac{1}{2}N,$$

$$m' = -\frac{1}{2}M + 1, \ldots, \frac{1}{2}M,$$

where, the matrix is $A_{n',m';n,m}$ is given by $$A_{n',m';n,m} = \sum_{q=-\frac{1}{2}N+1}^{\frac{1}{2}N} \sum_{r=-\frac{1}{2}M+1}^{\frac{1}{2}M} \overline{K_{q,r,n',m'}} K_{q,r,n,m},$$

the known vector $B_{n',m'}$ is given by $$B_{n',m'} = \sum_{q=-\frac{1}{2}N+1}^{\frac{1}{2}N} \sum_{r=-\frac{1}{2}M+1}^{\frac{1}{2}M} \overline{K_{q,r,n',m'}} p_{q,r}^{sct},$$

and n and n' are in-line spectral numbers, m and m' are cross-line spectral numbers, and the overline designates complex conjugation.

22. The medium of claim 20, wherein the preconditioner comprises an inverse of the system matrix for a horizontal source distribution.

23. The medium of claim 22, wherein the applying a preconditioner comprises applying the following equation:

$$\tilde{P}_{n,m} = [A_{n,m;n,m}]^{-\frac{1}{2}} = \left( \sum_{q=-\frac{1}{2}N+1}^{\frac{1}{2}N} \sum_{r=-\frac{1}{2}M+1}^{\frac{1}{2}M} |K_{q,r,n,m}|^2 \right)^{-\frac{1}{2}}.$$

24. The medium of claim 14, wherein the applying an iterative conjugate gradient scheme comprises:

selecting an initial estimate for iteration counter k=0, as follows:

$$P_n^{dgh(0)}=0, \, r_q^{(0)}=p_q^{sct};$$

calculating estimates for iteration counter k=1, as follows:

$$g_n^{(1)} = \tilde{P}_n \sum_q \overline{K_{q,n}} r_q^{(0)},$$

$$v_n^{(1)} = \tilde{P}_n g_n^{(1)},$$

$$Kv_n^{(1)} = \sum_n K_{q,n} v_n^{(1)},$$

$$\alpha^{(1)} = \frac{\sum_n |g_n^{(1)}|^2}{\sum_q |Kv_n^{(1)}|^2},$$

$$P_n^{dgh(1)} = P_n^{dgh(0)} + \alpha^{(1)} v_n^{(1)},$$

$$r_q^{(1)} = r_q^{(0)} - \alpha^{(1)} Kv_n^{(1)};$$

performing the following until an error criterion is met:

increasing the iteration counter by k=k+1; and calculating estimates for iteration counter k, using previous estimates calculated for k−1, as follows:

$$g_n^{(k)} = \tilde{P}_n \sum_q \overline{K_{q,n}} r_q^{(k-1)},$$

$$v_n^{(k)} = \tilde{P}_n g_n^{(k)} + \frac{\sum_n |g_n^{(k)}|^2}{\sum_n |g_n^{(k-1)}|^2} v_n^{(k)},$$

$$Kv_n^{(k)} = \sum_n K_{q,n} v_n^{(k)},$$

$$\alpha^{(k)} = \frac{\sum_n |g_n^{(k)}|^2}{\sum_q |Kv_n^{(k)}|^2},$$

$$P_n^{dgh(k)} = P_n^{dgh(k-1)} + \alpha^{(k)} v_n^{(k)},$$

$$r_q^{(k)} = r_q^{(k-1)} - \alpha^{(k)} Kv_n^{(k)}.$$

25. The medium of claim 24, wherein the error criterion is given by:

$$\frac{\sum_q |r_q^{(k)}|^2}{\sum_q |p_q^{sct}|^2} < 10^{-3}.$$

26. The medium of claim 18, wherein the inverse-transforming the solution comprises applying the following equation:

$$p^{dgh} = \frac{\Delta(s\alpha)\Delta(s\beta)}{4\pi^2} \sum_{n=-\frac{1}{2}N+1}^{\frac{1}{2}N} \sum_{m=-\frac{1}{2}M+1}^{\frac{1}{2}M} \exp(-js\alpha_n x_{1,q}^S - js\beta_m x_{2,r}^S) P_{n,m}^{dgh}.$$

* * * * *